United States Patent
Stark et al.

(10) Patent No.: US 9,729,442 B1
(45) Date of Patent: Aug. 8, 2017

(54) METHOD OF DETECTING LARGE FLOWS WITHIN A SWITCH FABRIC OF AN SDN SWITCH

(71) Applicant: Netronome Systems, Inc., Santa Clara, CA (US)

(72) Inventors: Gavin J. Stark, Cambridge (GB); Stuart C. Wray, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 344 days.

(21) Appl. No.: 14/634,848

(22) Filed: Mar. 1, 2015

(51) Int. Cl.
*H04L 12/741* (2013.01)
*H04L 12/931* (2013.01)
*H04L 12/947* (2013.01)

(52) U.S. Cl.
CPC ............ *H04L 45/745* (2013.01); *H04L 45/54* (2013.01); *H04L 49/25* (2013.01); *H04L 49/35* (2013.01)

(58) Field of Classification Search
CPC .................................................. H04L 45/745
See application file for complete search history.

(56) References Cited

U.S. PATENT DOCUMENTS

| | | | |
|---|---|---|---|
| 2012/0314709 A1 | 12/2012 | Post et al. | 370/392 |
| 2013/0058255 A1 | 3/2013 | Casado et al. | 370/255 |
| 2014/0237118 A1 | 8/2014 | Matthews | 709/226 |
| 2015/0012484 A1* | 1/2015 | Jindal | G06F 17/30289 707/609 |
| 2015/0055623 A1* | 2/2015 | Li | H04W 40/04 370/331 |
| 2015/0088827 A1* | 3/2015 | Xu | G06F 17/30215 707/634 |
| 2015/0370586 A1* | 12/2015 | Cooper | G06F 9/45533 710/308 |
| 2015/0381428 A1* | 12/2015 | Ong | H04L 41/12 709/223 |
| 2016/0028620 A1* | 1/2016 | Hari | H04L 45/38 370/389 |
| 2016/0050148 A1* | 2/2016 | Xu | H04L 47/24 370/235 |

(Continued)

OTHER PUBLICATIONS

"Implementing an OpenFlow Switch on the NetFPGA Platform", by Jan Naous et al., 9 pages (2008).

(Continued)

*Primary Examiner* — Andrew Lai
*Assistant Examiner* — Andrew C Lee
(74) *Attorney, Agent, or Firm* — Imperium Patent Works LLP; T. Lester Wallace; Mark D. Marrello

(57) ABSTRACT

A method of Software-Defined Networking (SDN) switching. A packet of a flow is received onto a SDN switch via a NFX circuit. The NFX circuit determines that the packet matches a flow entry stored in any flow table in the NFX circuit, counts the number of packets of the flow received, and determines that the number of packets of the flow received is above a threshold value. The NFX circuit then forwards the packet to a NFP circuit in the SDN switch. The NFP circuit determines that the packet matches a flow entry stored in the flow table in the NFX and generates a new flow entry that applies to a relatively narrow subflow of packets that is forwarded to and stored the flow table in the NFX circuit. A subsequent packet of the flow is switched by the SDN switch without forwarding the packet to the NFP.

20 Claims, 12 Drawing Sheets

(56) References Cited

U.S. PATENT DOCUMENTS

2016/0197831 A1\* 7/2016 De Foy .............. H04L 45/7453
370/392

OTHER PUBLICATIONS

"Cavium/XPliant CNX880XX Product Brief", by Cavium, Inc., 2 pages (2014).
Broadcom Delivers Industry's First High-Density 25/100 Gigabit Ethernet Switch for Cloud-Scale Networks, PRNewswire, 2 pages (Sep. 24, 2014).
"Implementing OpenFlow Switch Using FPGA Based Platform", by Ting Liu, Master's Thesis, Norwegian University of Science and Technology (Jun. 2014).
"Dell Strikes First, Cuts Deep With Tomahawk Switches", by Timothy Prickett Morgan, The Platform, 3 pages (Apr. 23, 2015).
"DevoFlow: Cost-Effective Flow Management for High Performance Enterprise Networks", by Jeffrey C. Mogul et al., 6 pages (2010).
"Engineered Elephant Flows for Boosting Application Performance in Large-Scale CLOS Networks", Broadcom Corporation, OF-DPA-WP102-R, 14 pages (Mar. 2014).
"Elephant Trap: A Low Cost Device for Identifying Large Flows", by Yi Lu et al., 15th IEEE Symposium on High-Performance Interconnects, 7 pages (2007).
"Using CPU as a Traffic Co-Processing Unit in Commodity Switches", by Guohan Lu et al., ACM978-1-4503-1477-0/12/08, 6 pages (2012).
"Netronome 100GbE NIC Targets SDN", by Bob Wheeler, Networking Report, 3 pages (Apr. 28, 2014).
"Using Hardware Classification to Improve PC-Based OpenFlow Switching", IEEE 12th Intl. Conf. on High Performance Switching and Routing, by V. Tanyingyong, 7 pages (2011).
"OpenFlow Switch Specification", version 1.1.0, 56 pages (Feb. 28, 2011).

\* cited by examiner

PRIOR ART #1
(OPENFLOW SYSTEM IN A BOX)

PRIOR ART #2
(OPENFLOW SYSTEM WITH SMALL PERCENTAGE OF PROCESSOR PACKET PROCESSING)

DATA CENTER

SDN SWITCH
(TOP-OF-RACK SWITCH)

SDN SWITCH
(TOP-OF-RACK)

ONE NFX CIRCUIT

ONE CORNER OF NFX

ONE FLOW ENTRY STORED IN ONE ENTRY FIELD OF THE FLOW TABLE

SDN MESSAGE

ONE SDN FLOW ENTRY IN THE FLOW TABLE IN THE NFP

MAC FRAME
(DATA MODE)

MAC FRAME
(COMMAND MODE)

1 = STRIP THE LEADING COMMAND HEADER AND THEN FORWARD THE REMAINDER TO ANOTHER NFX.
0 = CARRY OUT THE COMMAND AND DO NOT FORWARD THE COMMAND TO ANOTHER NFX.

ONE COMMAND HEADER

| DATA (8 BITS) | OPCODE (7 BITS) | MEANING |
|---|---|---|
| XXYYZZZZ | 0000000 | STRIP THE LEADING COMMAND HEADER AND THEN OUTPUT THE REMAINDER FROM THE EGRESS PORT IDENTIFIED BY THE DATA FIELD.<br>XX = CORNER<br>YY = EGRESS PORT OF THE CORNER |
| XXXXXXXX | 0000100 | ADD A FLOW ENTRY.<br>(THE PAYLOAD CONTAINS THE FLOW ENTRY) |
| XXXXXXXX | 0000101 | DELETE A FLOW ENTRY.<br>(THE FLOW ENTRY IS INDICATED BY THE PAYLOAD) |
| XXXXXXXX | 0000110 | REPORT STATS FOR A FLOW ENTRY.<br>(THE FLOW ENTRY IS INDICATED BY THE PAYLOAD) |
| XXYYZZZZ | 0000111 | SET AN NFX PORT TO OPERATE IN THE COMMAND MODE.<br>(THE PORT IS INDICATED BY THE PAYLOAD)<br>XX = CORNER<br>YY = EGRESS PORT OF THE CORNER |
| XXZZZZZZ | 0001000 | CONFIGURE MAC BLOCK.<br>(THE CONFIGURATION DATA IS CARRIED IN THE PAYLOAD)<br>XX = CORNER |

OPCODE OPERATIONS

FIG. 14

GENERATING SUBFLOW FLOW ENTRIES IN AN SDN SWITCH

IMPROVED OPERATION WITH NFX ARCHITECTURE

UPON POWER UP ONLY THE A1 PORTS OPERATE
IN THE COMMAND MODE

USE THE PORT MODESET COMMAND TO MAKE PORT C1
OF NFX 49 OPERATE IN THE COMMAND MODE

RECEIVE A COMMAND ONTO THE PORT C1 THAT
HAS BEEN PUT INTO COMMAND MODE

THE PORT C1 THAT HAS BEEN PUT INTO THE COMMAND MODE
THEN CARRIES OUT THE COMMAND

METHOD OF DETECTING LARGE FLOWS WITHIN A SWITCH FABRIC OF AN SDN SWITCH

TECHNICAL FIELD

The described embodiments relate generally to SDN (Software-Defined Networking) switches, and more particularly to structures and methods for efficient detection and handling of elephant subflows, and for switch partitioning, and for initializing of the switch.

BACKGROUND INFORMATION

FIG. 1 (Prior Art) is a perspective diagram of one type of conventional network switching device that operates in accordance with one particular SDN (Software-Defined Networking) protocol called "OpenFlow". OpenFlow provides a standard way to control the flow tables in the various switches of a network, even though the underlying hardware of the various switches may be different. A description of an OpenFlow compliant switch, the OpenFlow protocol, and the OpenFlow protocol stack is available from the OpenFlow Consortium at http://openflow.org and available as the OpenFlow Switch Specification, version 1.1.0, Implemented (Feb. 28, 2011). The device 1 includes a control plane blade 2, and numerous SDN switch blades 3. A blade is a printed circuit board assembly. All these printed circuit board blades are disposed in an enclosure or housing 4 as shown. The SDN switch blades 3 may operate together as a private network within the housing 4. How packets are forwarded from one switch to another within the device is defined by flow tables in the switches, and these flow tables are in turn configured and maintained by the control plane blade 2. Once packets of a flow are being switched by a switch within the device 1, the flow entry that controls how that flow is switched within the housing is not changed.

FIG. 2 (Prior Art) is a simplified block diagram of another type of conventional OpenFlow switching device 5 referred to as a top-of-rack (ToR) switch. Device 5 involves an x86-architecture-based control plane portion 6 and a switching portion 7, where the switching portion involves a fabric of integrated circuits available from Broadcom Corporation, 5300 California Avenue, Irvine, Calif. 92617. The control portion 6 executes an OpenFlow protocol stack and receives and outputs OpenFlow messages in accordance with the OpenFlow protocol. A relatively small percentage of the network traffic flow (for example, one percent) through the device is received onto the switching portion and is then passed up to the control portion 6 so that the control portion can determine how that traffic should be switched. When the determination is made, the switching portion outputs the traffic as dictated by the control portion. A relatively large percentage of network traffic flow (for example, ninety-nine percent) through the device 5, however, passes into the switching portion 7 and is switched out of the switching portion 7 without having to be passed up to the control portion 6. As in the case of the device OpenFlow device of FIG. 1, flow entries in the flow tables in the switching portion that determine how flows of packets are switched by the switching portion 7 are not changed once packets of such flows have started passing through the device.

SUMMARY

An SDN switch includes a fabric of Network Flow Switch (NFX) circuits, a Network Flow Processor (NFP) circuit, and a controller processor circuit. The controller processor circuit executes a standard operating system and a SDN protocol stack. Neither the NFP circuit nor any of the NFX circuits executes any operating system nor any SDN protocol stack. An SDN message (for example, an OpenFlow message) originating from outside the SDN switch that is destined for the SDN protocol stack of the controller processor circuit is received onto the SDN switch via one of the NFX circuits, passes through the fabric of NFX circuits to the NFP circuit via one or more network links, and then passes from the NFP circuit and across a serial bus (for example, a PCIe bus) to the controller processor, and is then processed by the SDN protocol stack. Likewise, the SDN protocol stack can generate an SDN message to be output from the SDN switch. Such a message is passed across the serial bus from the control processor to the NFP circuit, and then via one or more network links to and through the fabric of NFX circuits, and out of the SDN switch.

Although the NFP circuit does not execute an SDN protocol stack, the NFP circuit maintains a copy of the SDN flow table of the control processor. SDN flow entries in the SDN flow table of the control processor circuit are therefore also known to the NFP circuit. In addition, each NFX circuit contains multiple non-SDN flow tables. Depending on how the non-SDN flow tables in the NFX circuits are set up, a packet entering the SDN switch on one ingress port of the SDN switch can be made to pass through the fabric of NFX circuits so that it is then output from the fabric onto a particular egress port of the SDN switch, in compliance with the SDN flow table flow entries. The NFP circuit maintains a copy of all of the non-SDN flow tables in the NFX circuits, and handles and manages the flow entries in the non-SDN flow tables of the NFX circuits.

Unlike the relatively expensive and powerful NFP circuit that has instruction-fetching processors to classify and analyze and do deep packet inspection on packets, the NFX circuits are relatively less expensive and less powerful integrated circuits that do not have any instruction-fetching processors (that fetch without being prompted to by an external trigger or without being instructed to by having executed a specific fetch instruction), that have instruction counters, and that analyze packets. How the relatively simple NFX circuits handle and forward packet is setup by the NFP circuit, not the NFX circuit itself.

In one novel aspect, the SDN table of the control processor stores a first flow entry that defines how packets of a broad flow of packets is to be switched through the SDN switch. This same first flow entry is therefore also present in the SDN flow table of the NFP circuit. A packet of a subflow (a subflow within the broad flow) is received onto the SDN switch. In passing through the fabric of NFX circuits it is determined that the packet does not match any flow entry in the NFX circuit. The packet is therefore automatically forwarded from the NFX circuit via one or more network links to the NFP circuit. The NFP circuit consults its SDN flow table and determines that the packet matches the first flow entry for the broad flow. The action specified by the first flow entry indicates an output egress port. The packet is therefore forwarded back to the fabric of NFX circuits to be output from the indicated SDN egress port. Accordingly, the NFP circuit determines how the packet will be switched out of the SDN switch. The NFP circuit may use a special command packet to cause the packet to be output by the fabric of NFX circuit from the desired egress port. The NFP circuit is involved in the switching of such packets, so the NFP circuit can detect a condition in which multiple such packets of the narrow subflow are received onto the SDN switch in a predetermined amount of time. In one example, if the NFP circuit detects this condition, then the NFP circuit generates a new non-SDN flow entry for the subflow and causes this second flow entry to be loaded into the particular NFX circuit that has been receiving the packets of the subflow. The second flow entry is loaded into the flow table of that NFX circuit. When a subsequent packet of the subflow is then received onto the SDN switch, the NFX circuit determines that the packet matches the second flow entry, and in accordance with the action of the second flow entry the NFX circuit forwards the packet directly out of the SDN switch via the fabric of NFX circuits without forwarding the packet up to the NFP circuit. Accordingly, subsequent packets of the subflow are switched through the SDN switch in a cut-through manner without involvement of the NFP circuit, but yet the switching requirements of the higher-level first flow entry are still satisfied.

If a packet of the broad flow is then received onto the SDN switch that is not a packet of the subflow, then the NFX circuit receiving such a packet will determine that its second flow entry does not apply, and the packet will automatically be forwarded to the NFP circuit. The NFP circuit will then determine that the packet matches the first flow entry, and the action specified by the first flow entry will be used to control how the packet is switched out of the SDN switch. In this way, non-SDN flow entries for narrow subflows can be pushed out to the NFX circuit so that subsequent packets of such subflows will be switched through the SDN circuit by the NFX circuits without involvement of the NFP circuit. In one example, the NFP uses a set of novel command packets to add flow entries into the NFX circuits, to delete flow entries from the NFX circuits, to cause NFX circuits to forward packets back to the NFP circuit, and to cause a packet to be output by the NFX circuits from a desired SDN switch egress port, and to report status back to the NFP circuit.

In one novel aspect, the NFX circuits of the SDN switch are powered up and configured in a secure manner. Each NFX circuit is identical to every other NFX circuit. An NFX circuit powers up with only one of its ports (port A1) in a command mode. All other ingress ports of the NFX circuits power up in a data mode, but can later be instructed by a proper modeset command to begin operating in the command mode. The only way to configure an NFX circuit is by sending the NFX circuit a proper command packet on an ingress port that is operating in the command mode. In the power up method, none of the physical conductors that is coupled to a port (A1 port) that powers up in the command mode is made to extend outside the enclosure of the SDN switch. The only circuitry that can therefore drive these physical conductors, by virtue of how the NFX circuits are connected on the printed circuit boards within the SDN switch, is the NFP circuit. After power up, the NFP circuit sends proper command packets to these A1 ports, and thereby configures various ones of the other configurable ports of the NFX circuits so that they begin operating in the command mode. In addition, the NFP circuit sends proper command packets to NFX ports operating in the command mode to cause the NFX circuits to be configured, and to initialize the flow tables within the NFX circuits. Once another of the ingress ports of an NFX circuit has been set to operate in the command mode, that ingress port can then be used to receive a command packet whose indicated operation will then be carried out by the receiving NFX circuit. In one novel aspect, command packets destined for an NFP circuit are forwarded through one or more intervening NFX circuits of the fabric due to the way multiple command headers can be provided into command packets. Any forwarding NFX circuit pops the leading command header, and then forwards the remainder of the command packet on to the next NFX circuit. In this way, a command packet can be forwarded through a series of NFX circuits on its way to the ultimate destination NFX circuit that carries out the operation specified by the command packet.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 14 is a table that sets forth the various opcodes possible in a command header.

DETAILED DESCRIPTION

Reference will now be made in detail to background examples and some embodiments of the invention, examples of which are illustrated in the accompanying drawings.

Figure 3:
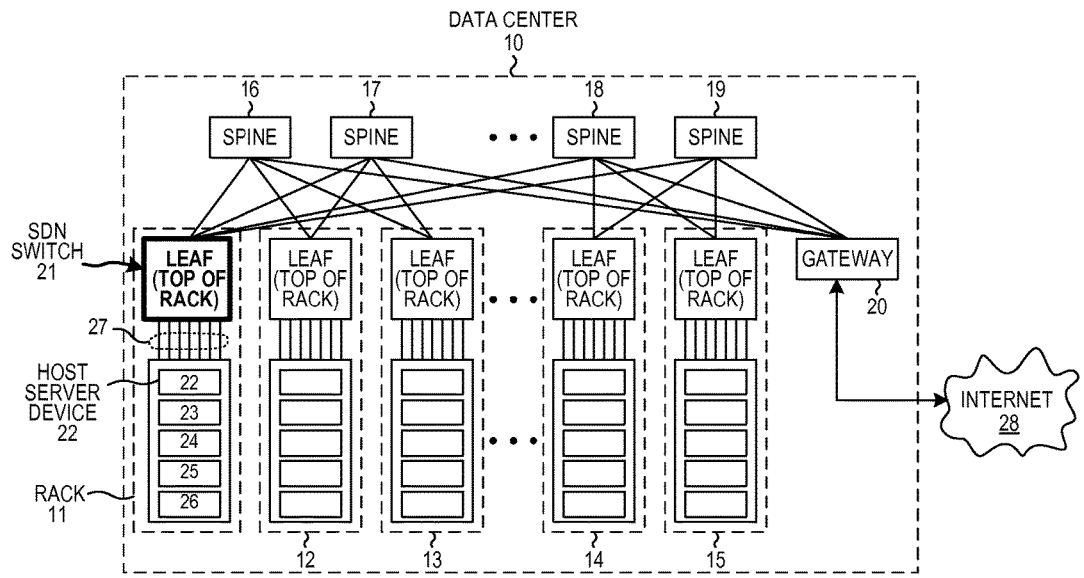
FIG. 3 is a diagram of a data center in accordance with one novel aspect.

FIG. 3 is a diagram of a system commonly referred to as a "data center" 10. Data center 10 in this example includes multiple racks 11-15 of networking devices, multiple spines 16-19, and a gateway device 20. External internet traffic from and to the internet 28 enters and exits the data center via the gateway device 20. For purposes of switching packets within the data center, the gateway may add a tag onto each packet as the packet enters the data center. The tags are used internally within the data center in accordance with an SDN (Software-Defined Networking) protocol. The gateway strips the tags off the packets when the packets leave the data center.

Figure 4:
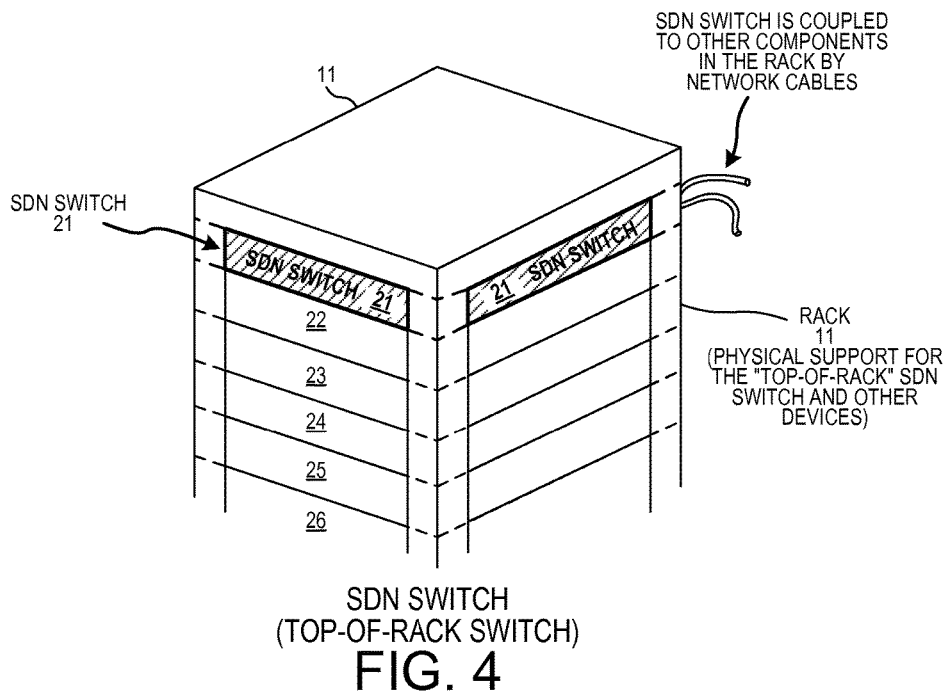
FIG. 4 is a diagram of a rack of network devices within the data center of FIG. 3.

FIG. 4 is a more detailed diagram of one of the racks 11 of FIG. 3. The rack 11 is a physical support structure that holds a stack of rectangularly-shaped networking devices. The upper networking device is a SDN switch 21 referred to a "top-of-rack" switch or "leaf". Although the SDN switch 21 is referred to as a "top-of-rack" switch, the SDN switch that performs this function and that is interconnected in this way need not actually be located in the uppermost slot. The SDN switch 21 involves a set of printed circuit boards and an associated interconnect backplane that are disposed in a rectangular box-like enclosure. The SDN switch 21 slides into the uppermost slot in the rack and is held in place and is physically supported by the rack. Multiple host server devices 22-25 are also held by the rack in slot positions below the top-of-rack switch. The top-of-rack switch 21 is coupled to each of the host server devices 22-26 by networking cables. A networking cable has a first plug that on one end of the cable plugs into a network port socket located on the back of the SDN switch 21 and also has a second plug that on the other end of the cable plugs into a network port socket located on the back of one of the server devices. The cable plugs and sockets are not illustrated in FIG. 4. As shown in FIG. 3, the top-of-rack SDN switches of the data center are typically not coupled directly to one another by network cables, but rather they may communicate with each other via appropriate ones of the spines as illustrated. The vertical lines 27 illustrated in FIG. 3 represent many networking cables that link the top-of-rack SDN switch 21 to the various server devices 26 of the same rack. Each of the racks of components is of the same structure.

Figure 5:
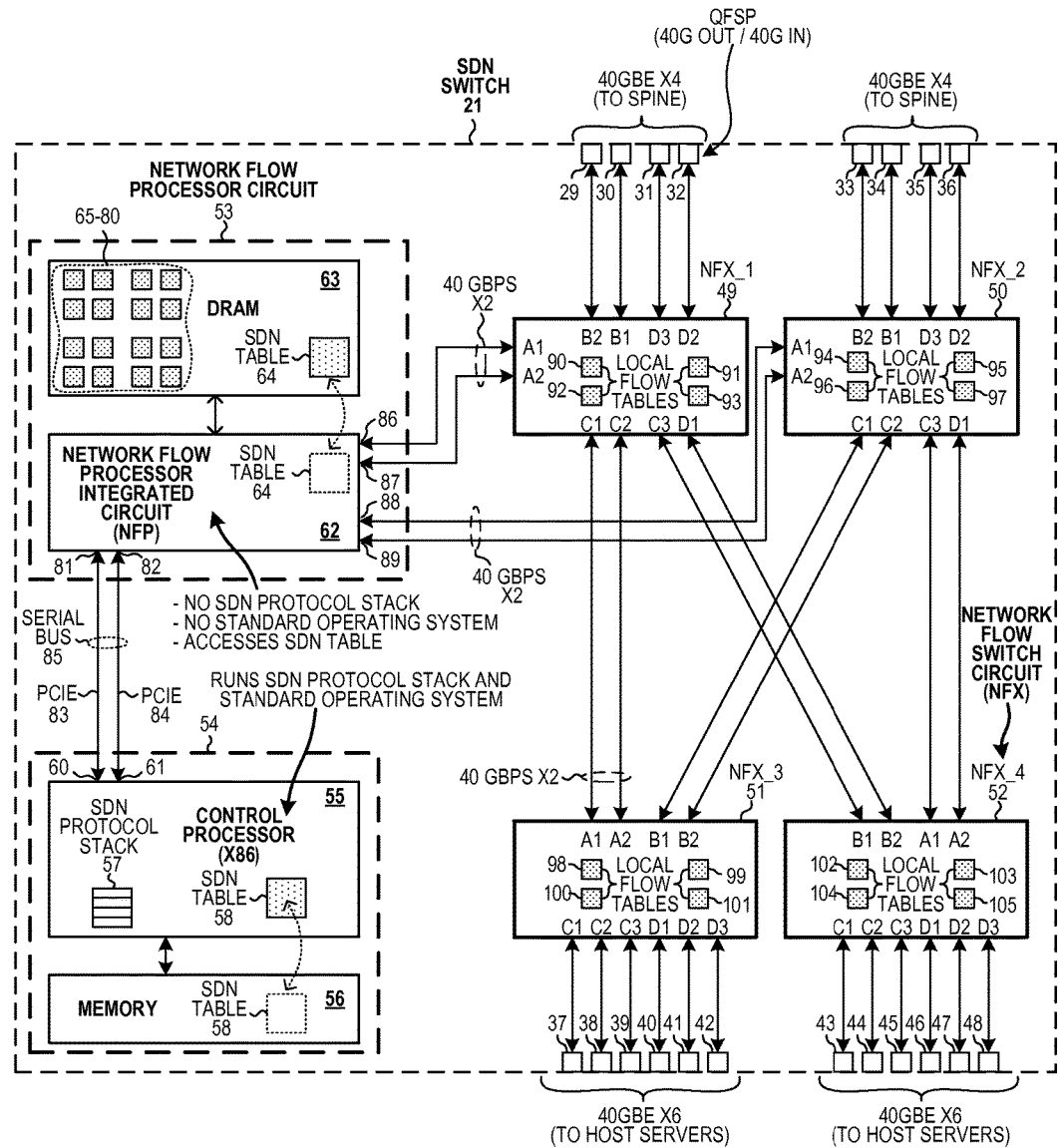
FIG. 5 is a block diagram of an SDN switch in the rack of FIG. 4.

FIG. 5 is a more detailed diagram of SDN switch 21. SDN switch 21 includes a plurality of QSFP 40 Gbps modules 29-48, four Network Flow Switch (NFX) circuits 49-52, a Network Flow Processor (NFP) circuit 53, and a control processor circuit 54. These electronic components are disposed on a set of printed circuit boards. The printed circuit boards are interconnected by a backplane. The printed circuit boards and the backplane are disposed in a box-like enclosure.

Each QSFP module has a socket for receiving a plug. The QFSP modules are disposed on the printed circuit boards so that the sockets are accessible from outside the enclosure. Each QSFP module provides transceivers for four outgoing optical fibers, and for four incoming optical fibers. Each optical fiber provides 10 Gbps communication, so the overall QSFP module provides 40 Gbps communication in both directions. The eight optical fibers are parts of a single optical cable that has plugs on either end to plug into QSFP modules sockets.

Control processor circuit 54 is a processor system that includes, among other parts not illustrated, a control processor integrated circuit 55 and an amount of memory 56. The control processor integrated circuit 55 in one example is a CPU processor integrated circuit such as an x86-architecture processor that runs a standard operating system, and that has PCIe bus interfaces 60 and 61 for communicating with other devices that have PCIe communication capabilities. A SDN protocol stack 57 is a part of, or is executing on, the operating system. In addition, the control processor circuit 54 stores an SDN flow table 59. The SDN flow table 59 is stored in a combination of the memory 56 and the processor 55. In the present example, the SDN protocol stack 57 is an OpenFlow protocol stack that is compliant with the OpenFlow Switch Specification, version 1.1.0, Implemented (Feb. 28, 2011). The OpenFlow protocol stack 57 causes OpenFlow flow entries to be added into, and to be deleted from, the SDN flow table 59. The OpenFlow protocol stack 57 can receive and handle OpenFlow compliant messages. The OpenFlow protocol stack also generates and outputs OpenFlow messages in accordance with the OpenFlow standard.

Network Flow Processor (NFP) circuit 53 is a processor system that includes, among other parts not illustrated, a NFP integrated circuit 62 and an amount of external memory 63. Of importance, the NFP circuit 53 does not execute any standard operating system, and the NFP circuit 53 does not execute any SDN protocol stack. In the specific example set forth here, the NFP integrated circuit 62 is an instance of the Island-Based Network Flow Processor integrated circuit set forth in U.S. patent application Ser. No. 13/399,888, entitled "Island-Based Network Flow Processor Integrated Circuit", filed Feb. 17, 2012, by Gavin J. Stark et al. (the subject matter of which is incorporated herein by reference). Although the NFP circuit 53 does not execute an SDN protocol stack, and does not execute any standard operating system of the type that would typically support an OpenFlow protocol stack, the NFP circuit 53 does maintain a copy of the SDN table 58. The copy of the SDN table 58 maintained by the NFP circuit 53 is identified by reference numeral 64. In addition, that NFP circuit 53 maintains a copy of a set of sixteen non-SDN flow tables 65-80. The NFP integrated circuit 62 has PCIe bus interfaces 81 and 82. Lines 83 and 84 represent a PCIe serial bus 85 that couples the control processor circuit 54 and the NFP circuit 53.

In addition to PCIe bus interfaces, the NFP integrated circuit 62 also has a set of network ports 86-89. Each of these network ports is a 40 Gbps bidirectional ethernet network port. The ingress portion of the port involves SerDes circuits and an instance of the ingress MAC island as set forth in U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference). The egress portion of the port involves an instance of the egress MAC island and the associated SerDes circuits.

Each of the four Network Flow Switch (NFX) circuits is identical to the others. In the example set forth here, an NFX circuit is an integrated circuit that has twelve network ports denotes A1, A2, A3, B1, B2, B3 C1, C2, C3, D1, D2 and D3. In the diagram of FIG. 5, two of the network ports, namely ports A3 and B3, are not used or connected to, so these ports are not illustrated. Each of the network ports is a 40 Gbps directional ethernet MAC port of the same structure and operation as ports 86-89 of the NFP integrated circuit 53, except that the ingress portions of the network ports of the NFX circuits have an additional capability to handle special command packets as set forth in further detail below. Of importance, none of the NFX circuits 49-52 stores or maintains any SDN flow table, but rather the flow tables maintained by and stored on the NFX circuit are novel and special non-SDN flow tables. The upper-left four flow tables 65-68 on the NFP circuit 53 are copies of the four non-SDN flow tables 90-93 stored in NFX circuit 49. The upper-right four flow tables 69-72 on the NFP circuit 53 are copies of the four non-SDN flow tables 94-97 stored in NFX circuit 50. The lower-left four flow tables 73-76 on the NFP circuit 53 are copies of the four non-SDN flow tables 98-101 stored in NFX circuit 51. The lower-right four flow tables 77-80 on the NFP circuit 53 are copies of the four non-SDN flow tables 102-105 stored in NFX circuit 52. None of the NFX circuits executes any operating system, and none of the NFX circuits has any instruction-fetching processor that fetches instructions, that has an instruction counter, and that analyzes any packet. Compared to the relatively large and powerful and complex master NFP integrated circuit 62 that may bring instruction-fetching processors to bear on analyzing packets, the NFX circuits 49-52 are small and relatively inexpensive slave switching circuits that perform directed switching functions on behalf of the NFP circuit.

Figure 6:
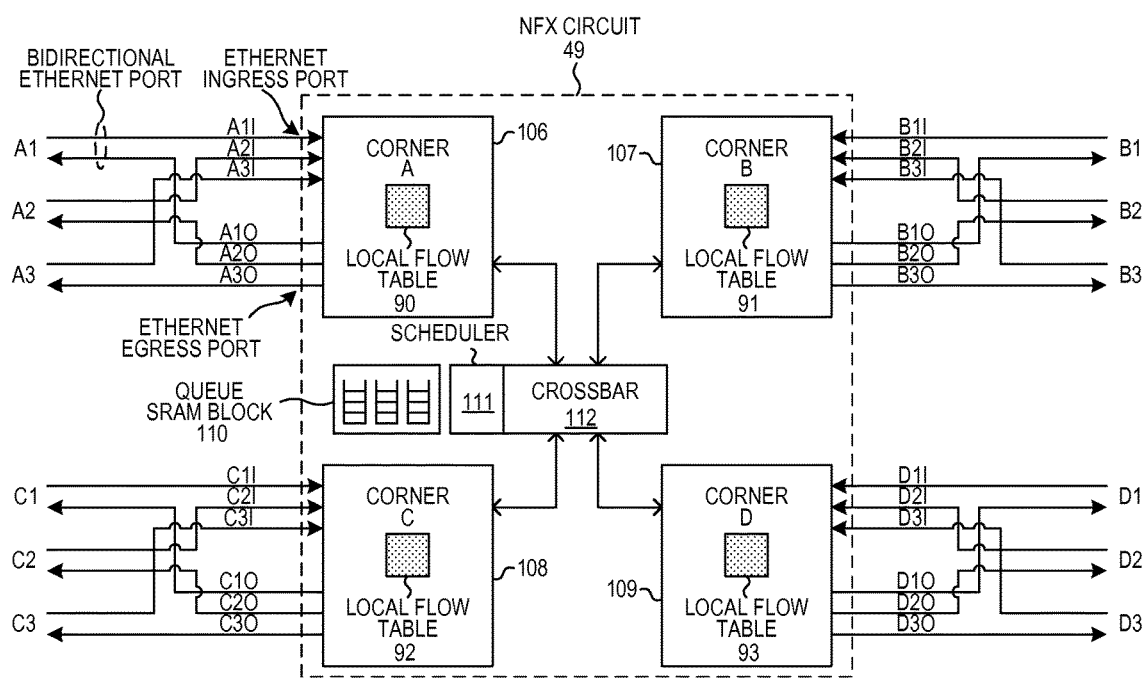
FIG. 6 is a block diagram of one of the NFX circuits in the SDN switch of FIG. 5.

FIG. 6 is a more detailed diagram of NFX circuit 49. As set forth above, all of the NFX circuits are identical integrated circuits in this example. NFX circuit 49 includes four corner portions 106-109 (denoted Corner A, Corner B, Corner C, and Corner D), a queue SRAM block 110, a scheduler 111, and a central crossbar switch circuit 112. Each corner portion stores its own non-SDN flow table as illustrated. Each corner portion has three 40 Gbps ethernet MAC ingress ports and three 40 Gbps ethernet MAC egress ports. For Corner A (106), the three ingress ports are denoted A1I, A2I and A3I, and the four egress ports are denoted A1O, A2O and A3O. Packet traffic coming into the NFX circuit is received via one of the ingress ports of a corner, and is communicated to the crossbar switch circuit 112, and then if appropriate is switched to exit the NFX circuit via an egress port of one of the corner portions. The crossbar switch circuit 112 direct the packet to the appropriate corner portion from which the packet will exit the NFX circuit.

Figure 7:
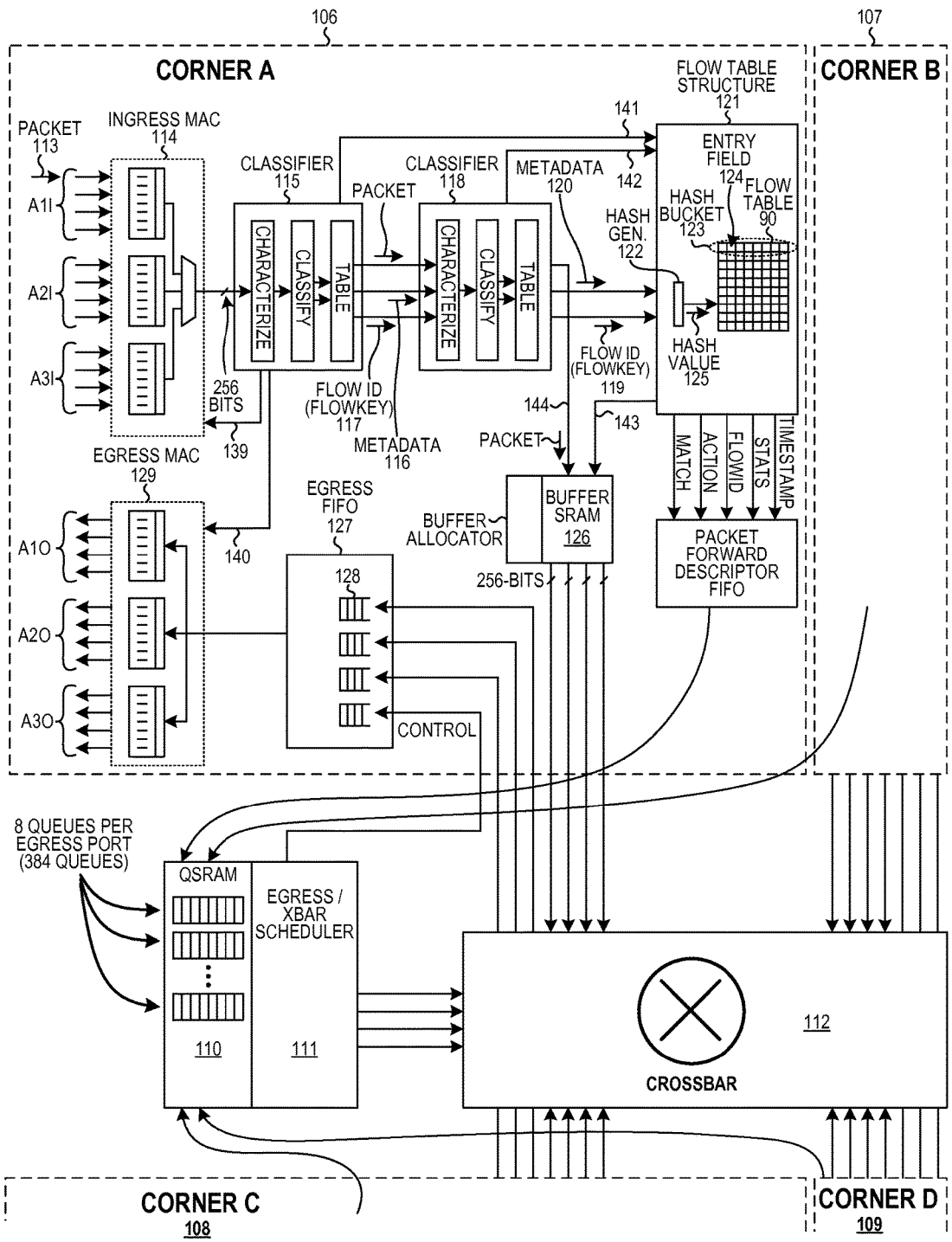
FIG. 7 is a more detailed diagram of one of the corner portions of the NFX circuit of FIG. 6.

FIG. 7 is a more detailed diagram of Corner A (106) of the NFX circuit 49 of FIG. 6. The circuitry of each of the four corner portions of the NFX circuit 49 is identical to the circuitry of each other corner portion. An incoming packet 113 is received onto one of the ingress ports by ingress MAC circuit 114. For additional information on ingress MAC circuit 114, see: U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference). In one specific example, the classifier circuit 115 is an instance of the picoengine pool as described in: 1) U.S. patent application Ser. No. 14/267,298, entitled "Kick-Started Run-To-Completion Processor Having No Instruction Counter", filed May 1, 2014, by Gavin J. Stark; and 2) U.S. patent application Ser. No. 14/311,222, entitled "Skip Instruction To Skip A Number Of Instructions On A Predicate", filed Jun. 20, 2014, by Gavin J. Stark (the subject matter of these two patent documents is incorporated herein by reference). As explained in those patent documents, the picoengines of the picoengine pool are very small run-to-completion processors that and do not fetch instructions on their own (without external prompting or without being prompted to by having executed a fetch instruction), and that do not have instruction counters. Accordingly, the classifier circuit 115 does not include any processor that fetches instructions (without being prompted to by an external trigger or without being instructed to by having executed a specific fetch instruction), and that does not have an instruction counter, and that analyzes packets. This classifier circuit, however, does characterize and classify the incoming packet, thereby generating metadata 116 about the packet. The resulting metadata 116 can include information about the packet, information about the flow to which the packet belongs, information about how the packet was initially processed, and so forth. As explained in further detail below, if the port is in a novel "command mode", then the classifier 115 interprets the incoming packet as a special command packet, and orchestrates carrying out the operation called for by the opcode of the command packet, and if necessary generates a special command mode command packet that is then output from an appropriate egress port of the NFX.

In addition to generating metadata, the classifier outputs a flow ID 117 (also referred to here as a "flow key"). The flow ID 117 is generated from various fields of the packet header. The flow ID 117 is a 256-bit value that is unique to the packet flow to which the packet belongs. In one example, a selected forty-eight bits are taken from the IP source field of the packet header, the IP destination field of the packet header, the TCP source port field of the packet header, the TCP destination port field of the packet header, and application layer protocol. The selected bits are concatenated in a particular way to generate a 48-bit first value. This 48-bit first value is supplied to a lookup table, and the lookup table outputs a second value having smaller number of bits. The lookup table is used to perform a type of compression. The bit values of this second value (as output from the lookup table) are then made to occupy certain bit positions in a larger 256-bit flow ID value. The other bit positions in the larger 256-bit flow ID value (bit positions that are not occupied by bits of the second value) are set to zero. A second classifier circuit 118 is provided to provide classification support for tunneled packets. A flow ID 119 and its associated metadata value 120 are supplied to a flow table structure 121.

Flow table structure 121 is a circuit that includes a hash generator circuit 122 and a memory and associated hash lookup circuitry. The memory maintains and stores the flow table 90 of the corner portion, where the flow table 90 includes a set of hash buckets, and where each hash bucket includes a set of entry fields. The illustrated hash bucket 123 is shown in the diagram as a row of boxes. The second entry field of the bucket is identified by reference numeral 124. The hash generator 122 generates a hash value 125 from the flow ID 119, and supplies the hash value 125 to the flow table circuitry. The hash value points to one of the hash buckets.

Figure 8:
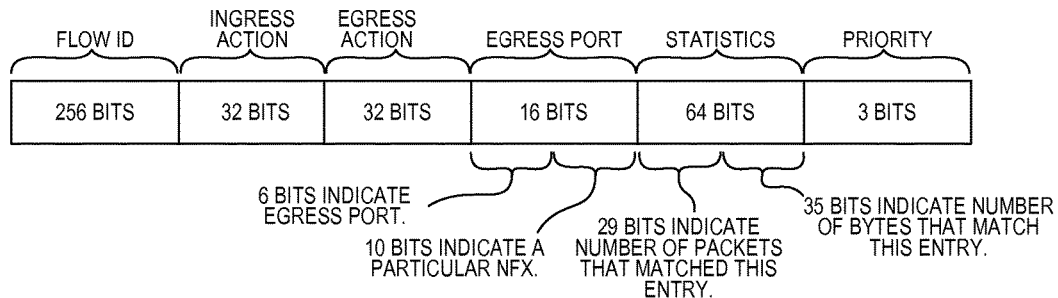
FIG. 8 is a diagram of the flow entry that is stored in an entry field in the flow table of the corner portion of FIG. 7.

FIG. 8 is a diagram that illustrates the values (a "flow entry") that are stored in one entry field of a hash bucket of the flow table if that entry field is occupied (occupied by a "flow entry"). The first 256-bit value in any occupied entry field of the hash bucket are tested to determine if one of the entry fields stores the 256-bit flow ID value 119. If it does, then there is said to be a "hit". If there is no match, then there is said to be a "miss". For there to be a hit, the 256 bits of the incoming flow ID must match exactly the 256 bits of the first 256-bit "flow ID" field at the beginning of the overall flow entry.

Assuming in this example that there is a "hit", then the remaining values (see FIG. 8) of the flow entry stored in the entry field are output as a match value (the number of the flow entry), an action value (the action indicator stored in the flow entry), the Flow ID value, a statistics value (as stored in the flow entry including a packet count portion and a byte count portion), and a timestamp value. The action may, for example, be an instruction to output the corresponding packet onto a particular egress port of a particular corner portion of the NFX circuit.

The actual packet, rather than being passed to the flow table structure 121, is buffered in buffer SRAM block 126. An instruction and information appropriate to cause the looked-up action to be carried out is loaded into the queue for the egress port (the egress port from which the packet is to be output from the NFX circuit in accordance with the looked-up action in this example). There is one such queue in block 110 for each egress port of the NFX circuit. At an appropriate time as indicated by the scheduler 111, the crossbar circuit 112 is controlled by the scheduler 111 to direct the packet (which is now being output by the buffer SRAM 126 to the crossbar circuit 112) through the crossbar switch circuitry to the particular FIFO 128 for the indicated egress port. Egress FIFO block 127 includes one such FIFO for each of the egress ports of the NFX circuit. The packets buffered in the FIFO 128 are supplied to an egress MAC circuit 129. For additional information on egress MAC circuit 129, see: U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference). The packet is then output from the egress port of the NFX as indicated by the flow entry in the flow table 90. As described in further detail below, the NFP circuit 53 controls how the NFX circuits 49-52 switch the incoming packets onto output ports of the SDN switch 21. The NFP circuit 53 does this by loading appropriate values into the flow tables of the NFX circuits.

A set of values in an entry field of a flow table of an NFX circuit is also referred to as a "flow entry". An incoming packet received onto the SDN switch 21 via one of the NFX circuits may be switched so that it is output from the SDN switch 21 via an NFX circuit. Alternatively, or in addition, an incoming packet received onto the SDN switch 21 via one of the NFX circuits may be switched so it is supplied across one of the network links to the NFP circuit 53. How the packet is switched depends on the type of packet received, and how the flow tables of the NFX circuits are loaded.

If there is a "miss", then there was no flow entry in the flow table structure 121 whose "flow ID" field matched (matched exactly) the "flow ID" of the incoming packet. In this case, the flow table structure 121 takes a default action. The default action is to forward the packet to the NFP circuit using a special command packet format. The NFP initializes the flow table structure of each NFX circuit so that the default action will generate a proper command packet with the proper command header or headers, and so that this proper command packet will be output from the NFX onto the correct NFX egress port such that the command packet will be make its way to the NFP.

Figure 9:
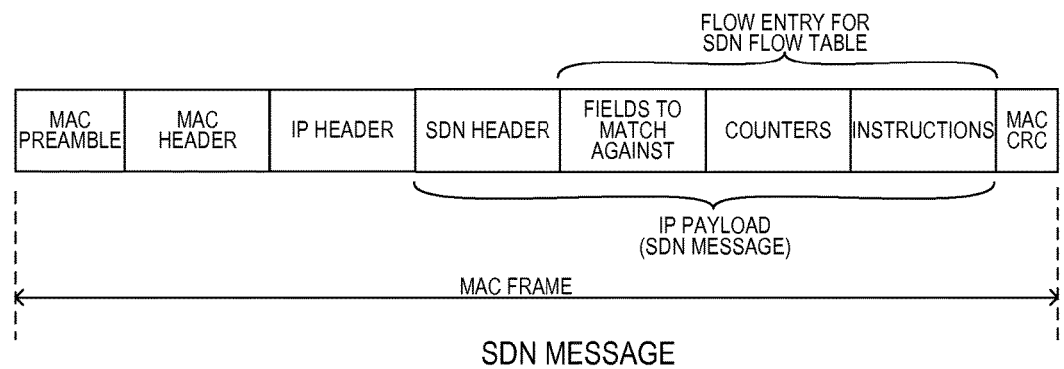
FIG. 9 is a diagram of an SDN message that might be received into or might be output from the SDN protocol stack in the controller processor circuit of FIG. 5.

FIG. 9 is a diagram of a packet that is received onto the SDN switch 21. This packet is, or contains, an SDN message that complies with the SDN protocol of the SDN stack 57. The terms "packet" and "frame" are used loosely and interchangeably in this explanation. The packet passes into the NFX circuit, and is classified and characterized, and determined to carry an SDN message. In this example, the flow table of the NFX circuit has been set up to forward this type of packet to the NFP circuit. The NFX circuit therefore outputs the packet via the egress portion of either its port A1 or A2 so that the packet is communicated to the NFP integrated circuit 62. In similar fashion to the way an NFX receives a packet, the NFP circuit receives the packet and classifies and characterizes the packet and determines that the packet contains an SDN message. The packet is therefore switched in accordance with a flow table in the NFP circuit so that the packet is communicated across the PCIe bus 85 and to the control processor circuit 54. The SDN stack 57 executed by the control processor 55 receives the packet, and extracts the SDN message, and handles the SDN message in accordance with the SDN protocol. The SDN message may, for example, be an instruction to add a flow entry into the SDN flow table 58. The SDN message may, for example, be an instruction to delete a flow entry form the SDN flow table 58. The SDN message may, for example, be a message involved in setting up a SDN connection.

In similar fashion, the SDN protocol stack 57 can cause an SDN message to be output from the SDN switch 21. To do this, the SDN protocol stack 57 generates a packet that contains the SDN message. The packet is then communicated across the PCIe bus 85 to the NFP circuit 53. The NFP circuit 53 in turn forwards the packet via the appropriate network link to the appropriate NFX circuit, so that the packet will eventually be output onto the correct egress port of the SDN switch 21 as specified by the SDN protocol stack 57. The SDN protocol stack 57 does not have an awareness of the interconnectivity of the fabric of the NFX circuits 49-52. The NFP circuit 53 handles communicating with the appropriate NFX circuit and controlling the NFX circuits so that in the end the packet will exit the SDN switch 21 in the correct manner.

From the perspective of networking devices external to the SDN switch 21, the SDN switch 21 is an SDN switch that operates in conformance with the SDN standard, and the external networking device has no knowledge of the interworkings of the NFP and NFX circuits. Accordingly, if an SDN flow entry is added to the SDN flow table 58, this flow entry must control how any matching packet will be switched and handled by the SDN switch. In one example, the SDN table 58 of the control processor circuit 54 is replicated in the NFP circuit 53 in the form of SDN table 64. In another example, the SDN table 64 in the NFP circuit 53 is not an exact copy of the SDN table 58 in the control processor circuit 54, but the same information is contained in the two tables. In either case, the NFP circuit 53 controls the loading of the non-SDN flow tables 90-105 of the NFX circuit so that they will switch packets in a way consistent with the higher-level SDN flow entry instructions. The control processor circuit 54 is not aware, however, of how these lower level non-SDN flow tables in the NFX circuits are loaded.

Figure 10:
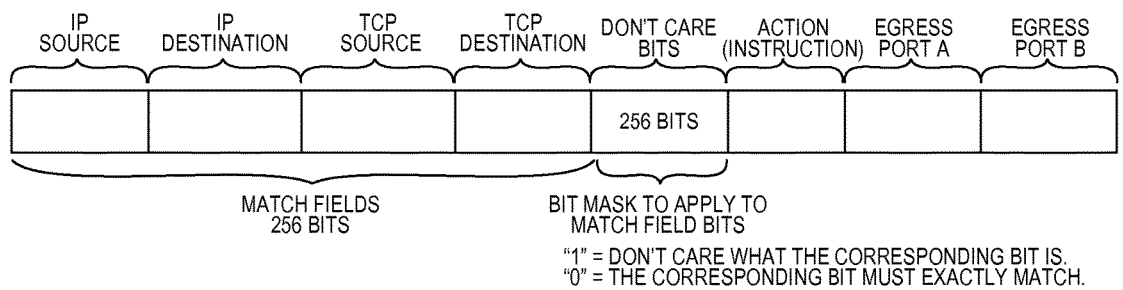
FIG. 10 is a diagram of one an SDN flow entry in the SDN flow table maintained by the NFP circuit.

FIG. 10 is a diagram of one particular example of a flow entry in the SDN flow table in the NFP circuit 53. The first 256 bits contain various match fields. The next 256 bits are a set of mask bits to apply to the first 256 bits. If a particular mask bit is a "1", then the value of the corresponding bit of the incoming packet does not matter and either value of that bit will be deemed to be a match. If, on the other hand, the particular bit is a "0", then the value of the corresponding bit of the incoming packet must match the corresponding bit value in the first 256 bits in order for the comparison to be deemed to be a match. If all the bits, masked and unmasked, are deemed to match in this fashion, then there is a "hit", and the action or instruction in the following bits of the entry are carried out. The action may, for example, be to output such a matching packet from a particular egress port of the overall SDN switch 21. Such flow entries are loaded into the SDN table 64 so as to carry out the actions and instructions specified by flow entries in the SDN table 58 in the control processor circuit 54.

Figure 11:
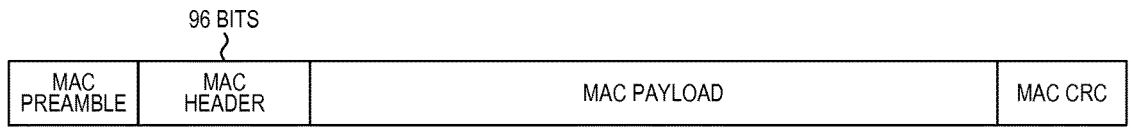
FIG. 11 is a diagram of a MAC frame, such as a MAC frame received onto an NFX port, when the port is operating in the data mode.

In accordance with one novel aspect, an ingress network port of an NFX circuit can operate in one of two modes: a data mode, or a novel command mode. In the data mode, an incoming packet is handled as set forth above in that the packet is characterized and classified and then switched in accordance a flow entry in the flow table of the corner portion. If there is a miss, then the packet is automatically forwarded to the NFP circuit so that the NFP circuit can determine how the packet will be switched out of the SDN switch. FIG. 11 is a diagram of a packet (also referred to here as a frame) that is received onto an ingress network port in the data mode. It includes a MAC preamble and start frame delimiter, a MAC header portion, a MAC payload portion, and a MAC CRC portion. The ingress MAC circuitry 114 of FIG. 7 detects the MAC preamble and uses the MAC CRC to check that the intervening bits were properly received, but the ingress MAC circuitry 114 does not otherwise use the intervening bits. All the network ports of the NFX circuits that receive external network traffic onto the SDN switch and/or that output network traffic out of the SDN switch (i.e., do not link to another NFX circuit) operate in this data mode.

Figure 12:
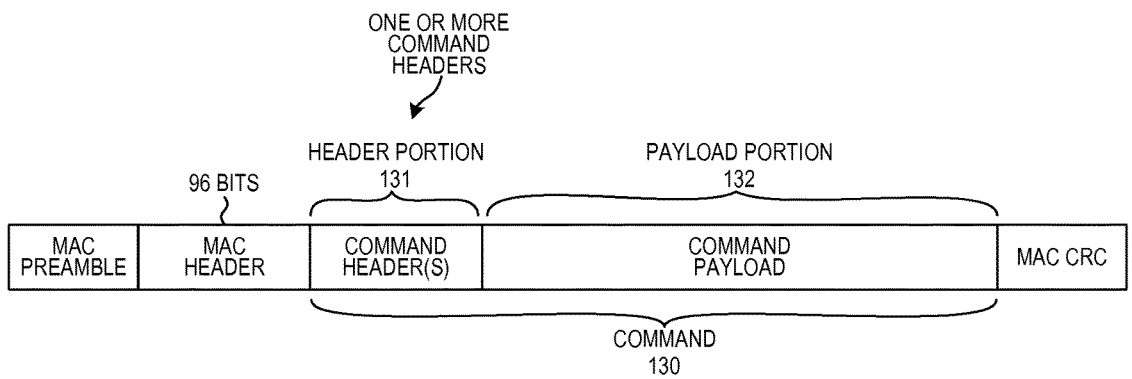
FIG. 12 is a diagram of a MAC frame, such as a MAC frame received onto an NFX port, when the port is operating in the command mode.
Figure 13:
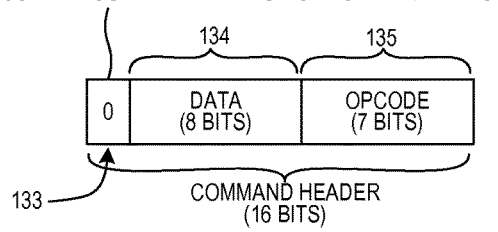
FIG. 13 is a diagram that illustrates the format of one of the command headers in the command of the MAC frame of FIG. 12.

In the novel command mode, the ingress network port receives a packet of the same form, but as illustrated in FIG. 12 the packet may contain a special command 130. The packet (MAC frame) passes through the same ingress MAC circuitry 114, but the subsequent classifier 115 interprets the MAC payload portion of the frame to be a special command. The command 130 includes header portion 131 (containing one or more command headers) and a payload portion 132. FIG. 13 is a diagram that illustrates the form of one command header. The command header has a leading bit 133, followed by an 8-bit data portion 134, followed by a 7-bit opcode portion 135. If the leading bit 133 of the first command header (first command header of the header(s) portion 131) is a "0", then the command is a command to be carried out by receiving NFX circuit. There is one and only one command header. If, however, the leading bit 133 of the first command header (first command header of the header(s) portion 131) is a "1", then the receiving NFX circuit is to strip the leading command header from the packet, and to forward the remainder of the packet (in the form of the MAC frame, without the removed command header) on to another NFX circuit as indicated by the data portion of the command header. In this way, a command can be forwarded from one NFX circuit to the next, with each forwarding NFX circuit popping off and removing the leading command header. The last command header will have a leading bit of "0", so that the NFX circuit that receives this command detects this "0" and carries out the operation specified by the opcode portion of the command. The operation may, for example, be to add a flow entry into an NFX flow table. The operation may, for example, be to delete a flow entry from an NFX flow table. The operation may, for example, be to output a packet carried by the payload onto a particular egress port of the NFX circuit. Once the NFX circuits of the SDN switch are powered up and are properly set up by the NFP circuit, all the network ports of the NFX circuits that couple directly to other NFX circuits are made to operate in this command mode. Intercommunication between NFX circuits uses this command mode.

FIG. 14 is a table that sets forth the operations specified by the various opcodes that may be present in a command. An opcode of "0000000" indicates that the receiving NFX circuit should strip the leading command header, and forward the resulting packet out of the corner portion and egress port identified by the data portion of the command header. The payload of the original incoming command is therefore forwarded out of the NFX as the payload of the outgoing command, the difference between the two commands being that the outgoing command has one fewer command header (the leading command header of the incoming command is removed to make the outgoing command). An entire packet (for example, a packet received onto the SDN switch that resulted in a "miss" in the receiving NFX circuit) can be forwarded through an NFX circuit using this command, by including the packet as the payload portion of the command.

An opcode of "0000100" is an instruction to add a flow entry, where the payload of the packet is the flow entry to be added.

An opcode of "0000101" is an instruction to delete a flow entry, where the payload of the packet identifies the particular flow entry to be deleted by its flow ID. The classifier that carries out the operations of the add flow entry opcode and the delete flow entry opcodes by using connections 141 and 142 (see FIG. 7) to communicate with and control the flow table structure 121 so that the flow table 90 is changed as indicated by the command.

An opcode of "0000110" is an instruction to report status or statistics for a flow, where the particular flow ID identifying the flow is set forth in the payload of the command. Such status may, for example, be the total number of packets of this flow that have been received, and the total number of bytes that have been received of this flow. This statistics information is maintained as part of the flow entry for the flow ID of the flow. The statistics are reported by the NFX sending a command packet back to the NFP circuit. The command packet that is sent back carries the statistics information. To form this command packet, the called for statistics information from the flow table 90 is supplied by connection 143 from the flow table structure 121 to the buffer SRAM block 126 where the command packet to be output is formed, and in this way the statistics information is made part of the outgoing command packet. The classifier that carries out the statistics operation as called for by the opcode forms the remainder of the packet complete with its command headers, and loads that part of the command packet via connections 144 into the buffer SRAM block 126.

An opcode of "0000111" is a "modeset" instruction to set a particular port on the NFX circuit to begin operating in the command mode, where the particular NFX port is given by the content of the data portion of the command.

An opcode of "0001000" is an instruction to configure a particular MAC circuit 114 or 129, where the configuration data to be loaded into the MAC circuit is carried in the payload of the command, and where the particular MAC circuit to be configured is set forth in the data portion of the command. In this way, the speed of the MAC ports, the width of the MAC ports, and the power levels of the MAC ports can be configured. Connections 139 and 140 shown in FIG. 7 are used to communicate the configuration data from the classifier (that carries out the "000100" opcode) to the ingress MAC circuit to be configured.

Consider, for example, a situation in which the NFP circuit 53 needs to add a flow entry into the flow table 105 of NFX circuit 52. Note that NFP circuit 53 is not directly coupled by a single network connection or link to NFX 52, but rather there is an intervening NFX circuit (either NFX 50 or NFX 49). Assume for purposes of this example that the ingress portion of the A1 network port of NFX circuit 50 is in the command mode, and further assume that the ingress portion of the A1 network port of NFX circuit 52 is in the command mode. The NFP circuit 53 generates a MAC frame that contains a special command of the type set forth in FIG. 12, where there are two command headers, and where the payload portion of the frame is the flow entry to be added. The leading command header of the MAC frame is an instruction to the receiving NFX circuit to forward the packet out of its egress port C3 after stripping the leading command header. The second command header has an opcode of "0000100" and is an instruction to the receiving NFX circuit, in this case NFX circuit 52, to add the flow entry carried in the payload portion of the frame into the flow table 105 as indicated by the data portion of the command header. This MAC frame, with the two command headers, is output from network port 88 of the NFP circuit 53 in ordinary fashion as an ordinary MAC frame. The ingress portion of the A1 network port of NFX 50, however, receives the MAC frame and because the ingress portion is in the command made, the ingress portion interprets the leading command header, and in accordance with the leading command header forwards the remainder of the MAC frame out of network port C3. Which port to output the MAC frame from is indicated by the data portion of the leading command header. The resulting MAC frame at this point has only one command header, and this MAC frame with one command header is received onto the A1 port of NFX circuit 52. Because the ingress portion of the A1 network port is operating in the command mode, the command header is interpreted. This command header has an opcode of "0000100", so the flow entry contained in the payload of the MAC frame is added to the flow table 105. Because the NFP circuit 53 stores information about the configuration and interconnectivity of the fabric of NFX switches, the NFP circuit 53 can generate a MAC frame with the appropriate command headers such that a desired command is supplied to the desired NFX circuit, even if the NFP is not directly coupled to the NFX circuit to which the ultimate command is directed. In this way, using such commands, the NFP circuit 53 controls the content of the flow tables of the NFX circuits and controls the operating mode of each NFX port. The NFP can cause a command packet to be sent to any one of the NFX circuits, where the command is an instruction to output the payload of the command in the form of a packet onto any one of the egress ports of the NFX circuit, and where the packet as output onto the egress port is actually a command packet itself.

Figure 15:
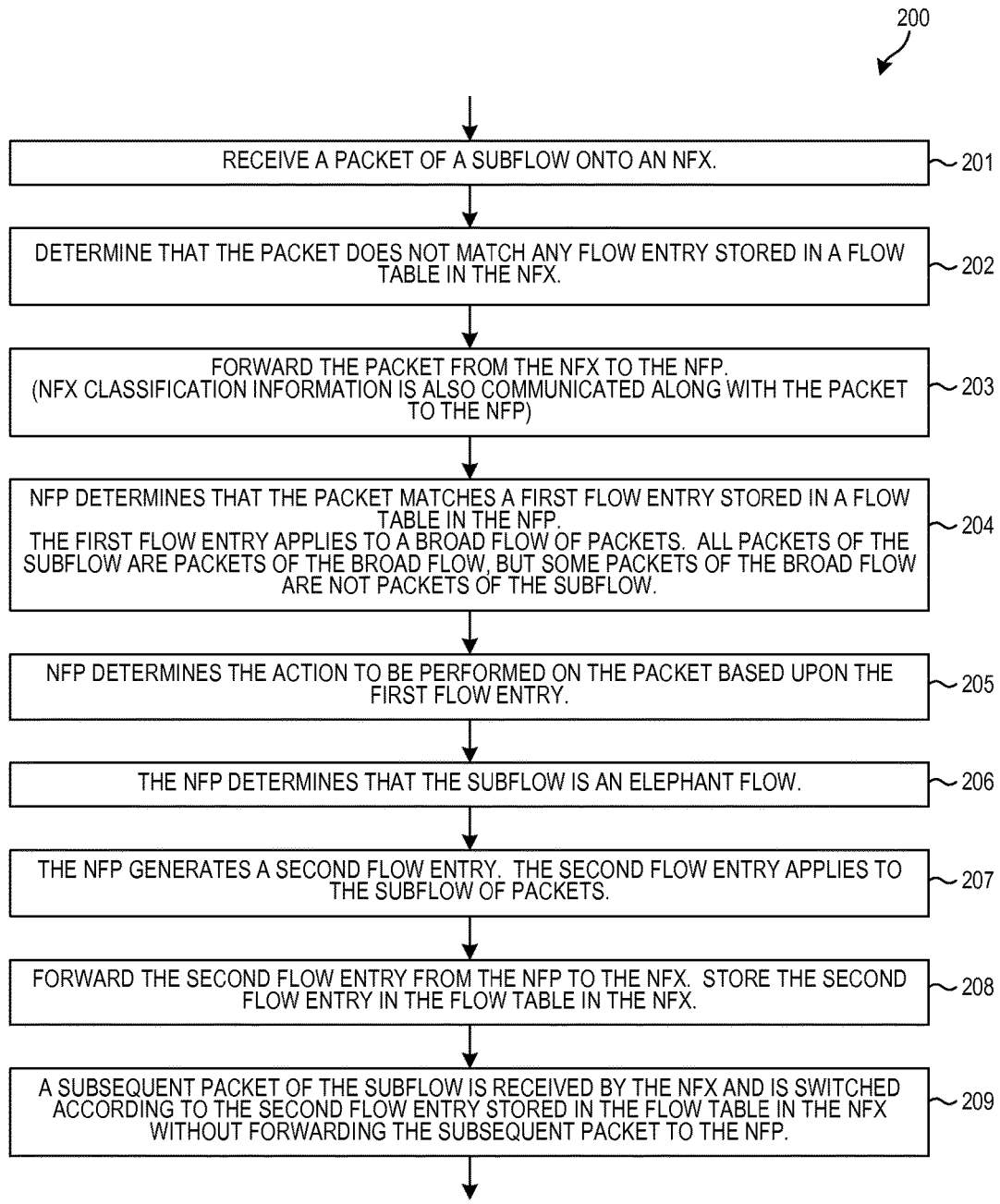
FIG. 15 is a flowchart of a method in accordance with one novel aspect.

FIG. 15 is a flowchart of a method 200 in accordance with one novel aspect. A packet of a subflow is received (step 201) onto the SDN switch via an ingress network port of an NFX circuit that is operating in the data mode as described above. The NFX circuit determines (step 202) that the packet does not match any flow entry stored in the relevant flow table in the NFX circuit. In the example of the NFX circuit described above where there are four corner portions to the NFX circuit, each having its own flow table, the packet is determined not to match any flow entry in the relevant flow table of the corner portion whose ingress port received the packet. Had the packet matched a flow entry, then the packet would have been handled in accordance with the action set forth in the flow entry, but due to the packet not matching any flow entry, the packet is automatically forwarded (step 203) from the NFX circuit through the fabric of NFX circuit and to the NFP circuit. In one example, the packet is forwarded using a special command packet where the opcode is "0000000". Classification metadata generated by the receive-processing circuitry is also forwarded along with the packet. In the event that in the particular fabric of NFX circuit involved the NFX circuit that initially received the packet onto the NFX switch is not directly coupled to the NFP circuit, then the packet is forwarded through another one or more NFX circuits as necessary to get the packet to the NFP circuit.

Next, the NFP circuit receives the packet on one of its network ports and performs ingress processing on the packet. In the example of the method 200 of FIG. 15, the NFP circuit determines (step 204) that the packet matches a "first flow entry" stored in the SDN flow table 64. This first flow entry applies to a broad flow of packets, where all packets of the subflow are packets of the broad flow, but where some packets of the broad flow are not packets of the subflow.

The NFP determines the action (step 205) to be performed from the action field of the matching "first flow entry". In the present example, the action is an instruction to output the packet from a particular egress port of the SDN switch. The packet is therefore forwarded from the NFP circuit, via network links through the fabric of NFX circuits, to the appropriate NFX circuit and out of the egress port of the SDN switch required by the first flow entry. The packet is forwarded using a special command packet as described above, such that the last receiving NFX circuit is directed by the last command header to output the packet from a particular egress port. Accordingly, the received packet was passed to the NFP circuit and under the control the NFP circuit was then output from the proper egress port of the SDN switch in accordance with the first flow entry (for the broad flow) in the SDN flow table in the NFP circuit.

Multiple such packets of the subflow may be received in this fashion onto the SND switch such that they pass through the NFP circuit before being output from the SDN switch in accordance with the action defined by the first flow entry. In the present example, if a predetermined number of such packets of the same subflow is received onto the NFP circuit within a predetermined amount of time, then the NFP determines that the subflow is a particular type of subflow, the packets of which are to be handled by the NFX circuits in a different fashion from the way other packets of the broad flow (that are not packets of the subflow) are to be handled. In one example, the subflow is determined (step 206) to be such a heavy flow, and it is further determined that packets of this subflow do not need to be forwarded to the NFP circuit special analysis, but rather future packets of this subflow can simply be switched out of the SDN circuit. Such a subflow is called an "elephant" flow. In the example of the method 200 of FIG. 15, such an elephant subflow is detected. The first packets of the elephant subflow are analyzed by the NFP circuit and the NFP circuit determines that remaining packets of the elephant subflow can be output from the SDN switch without analysis by the NFP circuit. The NFP then generates (step 207) a special "second flow entry" to be used by the receiving NFX circuit. The NFP circuit then causes the second flow entry to be communicated (step 208) to the NFX circuit in the form of a "add flow entry" command packet. The "add flow entry" command packet is received on an ingress port of the destination NFX circuit, where the ingress port is operating in the command mode. The receiving circuitry of the NFX circuit detects the opcode of the "add flow entry" command, and responds by storing the "second flow entry" into the indicated flow table of the corner portion of NFX circuit (the corner portion that has been receiving packets of the subflow).

At this point, the overall NFX switch 21 is configured to handle some packets of the broad flow in a different fashion than other packets. More particularly, packets of the detected "elephant" subflow are to be switched out of the SDN switch by the fabric of NFX circuits without the assistance or involvement of the NFP circuit, whereas other packets of the broad flow (that are not packets of the elephant subflow) are to be passed from the fabric of NFX circuit to the NFP circuit so that the NFP circuit can determine how those packets should be handled.

In the method 200 of FIG. 15, a subsequent packet of the elephant subflow is then received (step 209) onto the same ingress port of the SDN switch 21. This subsequent packet passes into to the same NFX circuit that received prior packets of the elephant subflow onto the SDN switch, but due to the second flow entry now being stored in the NFX circuit, the NFX circuit determines that the subsequent packet matches the second flow entry. At this point in the ingress process, the NFX circuit updates the statistics field of the second flow entry. The packet count portion of the statistics field is incremented by one, and the byte count portion of the statistics field is increased by the number of bytes in the packet being handled. The NFX circuit then performs the action indicated by the second flow entry without the subsequent packet having to be forwarded to the NFP circuit. In the present example, the action is an instruction to forward the packet through the fabric of NFX circuits, and to output the packet from the proper egress port of the SDN switch (the same SDN switch egress port specified by the first flow entry in the NFP circuit). The manner of switching the packets of the broad flow out of the SDN switch as required by the SDN flow entry is maintained, so from outside the SDN switch 21 the switch is seen to operate properly in accordance with the SDN protocol. In addition, the updated second flow entry is communicated to the NFP circuit so that the copy of the NFX flow table that the NFP maintains will continue to match the flow table in the NFX circuit.

Although an example is set forth in FIG. 15 in which the second flow entry that determines how the subflow will be handled is a simple switching out of packets, other types of "second flow entries" with other types of actions can be used in other examples. In one example, the manner of load balancing of packets of the broader flow across multiple SDN egress ports is modified or changed dynamically when an elephant subflows is detected. Multiple flow entries for multiple subflows can be pushed out and stored in an NFX circuit so that packets of different subflows (of the same broad flow) are handled in different ways, while all the while satisfying the overarching SDN-defined requirements on the broad flow of which the subflows are a part.

Figure 1:
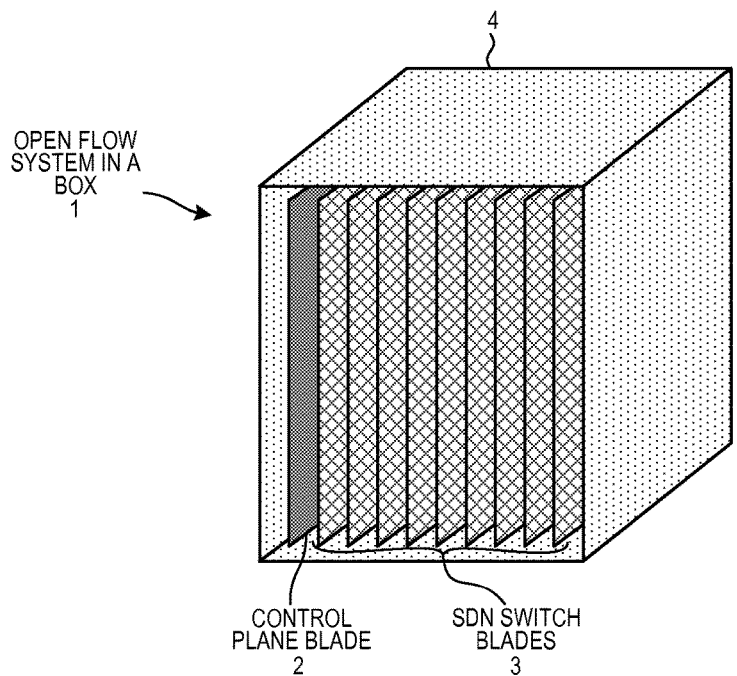
FIG. 1 (Prior Art) is a perspective diagram of a first type of conventional network switching device that operates in compliance with the OpenFlow SDN protocol.
Figure 2:
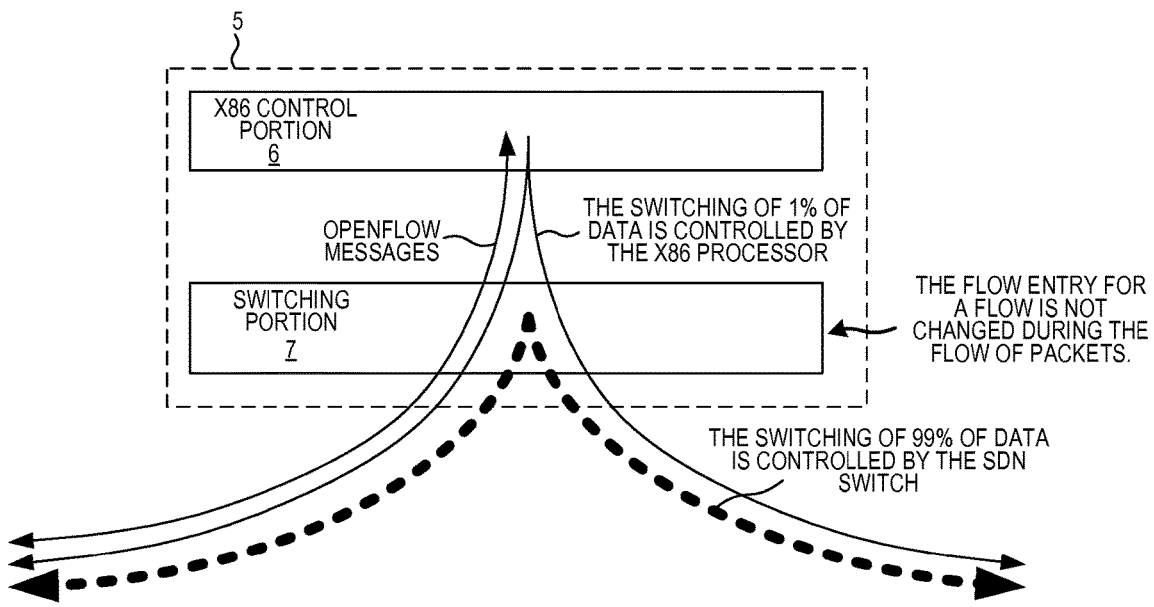
FIG. 2 (Prior Art) is a simplified block diagram of a second type of conventional OpenFlow switching device.
Figure 16:
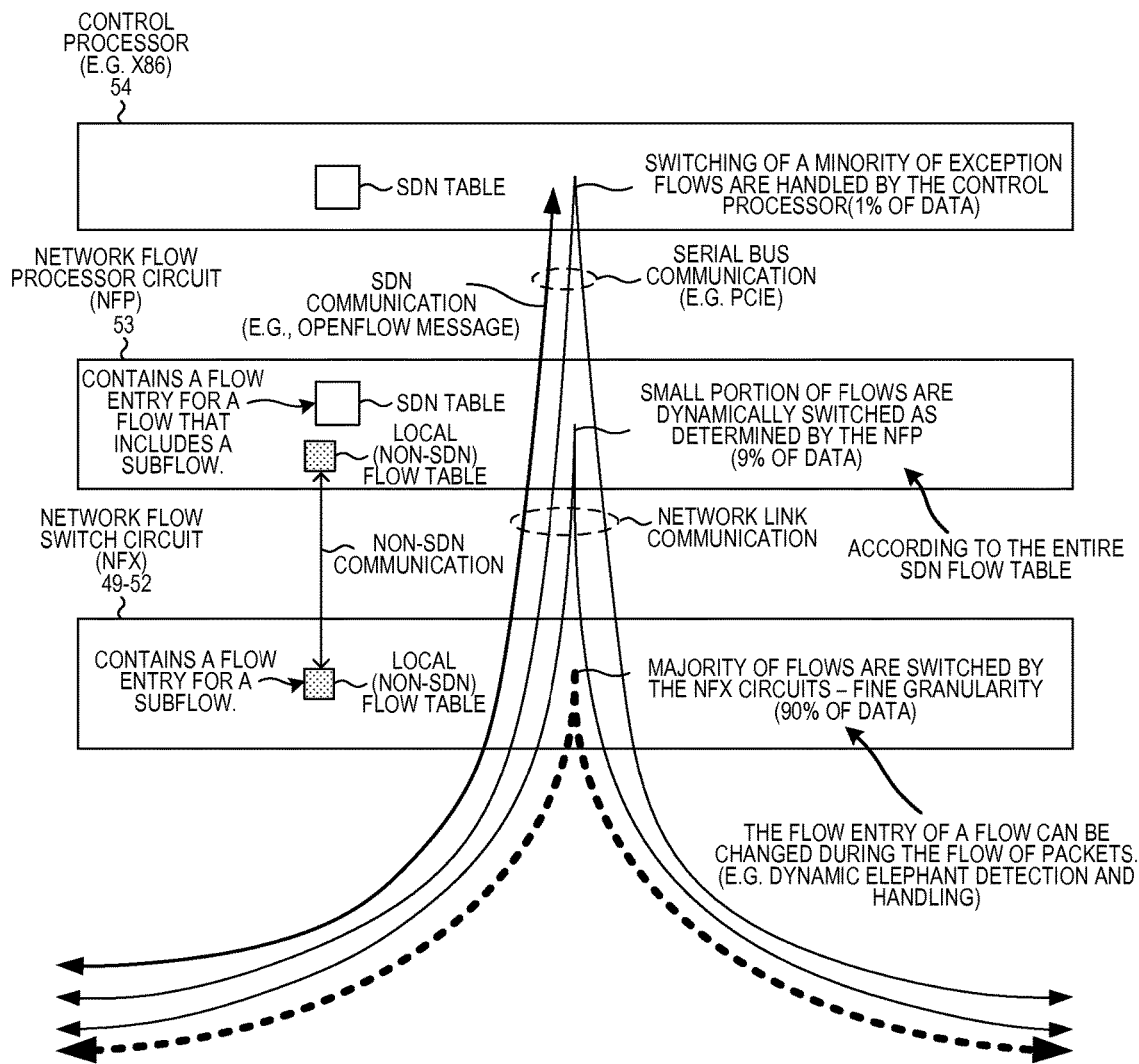
FIG. 16 is a diagram that illustrates important differences between the structure and operation of the novel SDN switch of 21 and the prior art device of FIG. 2.

FIG. 16 is a diagram that illustrates important differences between the structure and operation of the novel SDN switch 21 and the prior art device of FIG. 2. As shown in FIG. 16, a high percentage (for example, 99 percent) of network traffic passing through the SDN switch 21 is not processed by any instruction-fetching processor such as in a typical NFP integrated circuit or in a standard control processor that runs an SDN protocol stack in an ordinary OpenFlow switch. Rather, a fabric of less expensive and less processing-intensive NFX circuits receives packets onto the novel SDN switch and switches the packets out of the novel SDN switch. The configurable nature of the network ports of the NFX integrated circuit employed allows multiple different embodiments of the novel SDN switch architecture to be easily realized, where the different embodiments have different fabrics of NFX circuits with different numbers of NFX circuits. In the novel SDN switch architecture, the NFP circuit handles setting up and controlling the fabric of NFX circuits in a way that is consistent with the SDN flow table forwarding rules specified for the SDN switch. The NFP circuit also brings high-speed packet analyzing hardware to bear in checking packets passing through the NFX circuits and in determining which packets and flows can be switched through the fabric of NFX circuits without requiring deeper more intensive analysis that the NFX circuits cannot provide. Due to the controller processor circuit 54, the SDN protocol stack software of the system is run in a standard operating system environment on a standard-architecture (for example, x86 architecture) processor system. Unlike the device of FIG. 2 where the switching of a flow is not changed once packets of the flow have been received by the switch, the novel SDN switch 21 can dynamically change the way packets of an existing and active flow are handled. In a manner that is unknown and transparent from the perspective of the SDN interface of the SDN switch, elephant flows are: 1) detected within the SDN switch by the NFP, 2) determined to be safe for switching straight through the NFX fabric without deep packet inspection or otherwise forwarded to any NFP, and then 3) switched straight through the NFX fabric without passing through deep packet inspection in any network flow processor.

Figure 17:
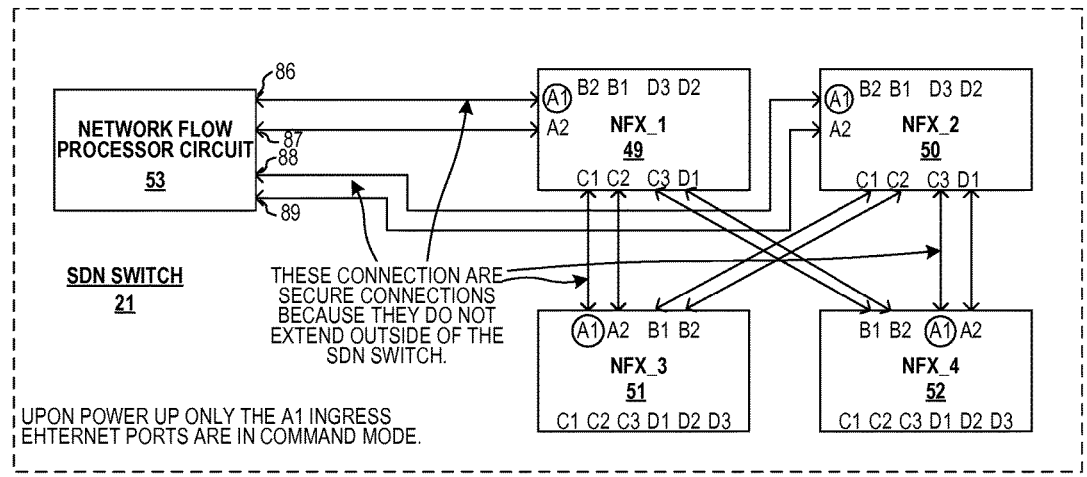
FIG. 17 is a diagram of a first step of an NFX configuration method.

FIGS. 17-20 illustrate one way of powering up and configuring a fabric of NFX circuits. FIG. 17 illustrates a first step in a configuration method in which each of the NFX circuits 49-52 powers up with its A1 port being the only port in the special "command mode". All the NFX circuits are identical integrated circuits and they all power up in the same fashion. Upon power up, none of the other ports (other than the ingress portion of port A1) is in the command mode so none of the other ports can carry out a modeset command. The printed circuit board and circuitry of the SDN switch is such that none of the physical connections leading to the ingress portion of an A1 port extends outside of the SDN switch enclosure. Because the only ports that power up in the command mode are the A1 ports, and because physical access to these A1 ports is under the control of the NFP circuit, and because these A1 ports are not physically accessible from outside the enclosure, the configuration of all other NFX ports using command mode commands is entirely under the control of the NFP circuit 53. Similarly, the programming of all the flow tables 90-105 of the NFX circuits is under the control of the NFP circuit 53.

The NFP circuit 53 uses the A1 ports to which it is attached to convert other ports, one by one, into the command mode, as required for the particular fabric of NFX circuits desired. Ultimately, at the end of the configuration operation, all NFX ports coupled to inter-NFX connections are to be put into the command mode, and all NFX ports coupled to communicate external network traffic (coupled to QSFPs in the example of FIG. 5) are to remain in the data mode. In one example of such a configuration operation, NFP circuit 53 uses the A1 port of NFX circuit 49 to load its flow tables 90-93, and then forwards commands through NFX circuit 49 to NFX circuit 51 to load its flow tables 98-101. Similarly, NFP circuit 53 uses the A1 port of NFX circuit 50 to load its flow tables 94-97, and then forwards commands through NFX circuit 50 to NFX circuit 52 to load its flow tables 102-105.

Figure 18:
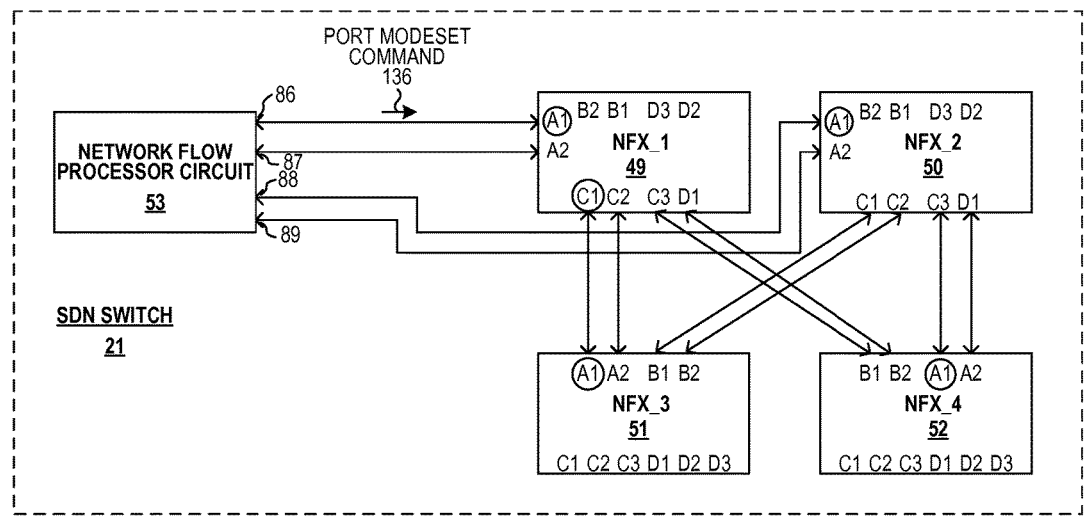
FIG. 18 is a diagram of a second step of the NFX configuration method.

FIG. 18 illustrates a second step of the configuration method. In the case of NFX circuit 49, operation of the particular NFX fabric illustrated requires that NFX circuit 51 be able to send commands (command mode commands) from the A1 port of NFX circuit 51 into the C1 port of NFX circuit 49. How the NFX circuits of the fabric are to be configured is stored in the NFP circuit 53. Accordingly, the NFP circuit 53 sends a modeset command 136 to NFX 49 to change the mode of port C1 so that the ingress portion of port C1 will operate in the command mode. In the illustration, command mode operation of a port is denoted by the port number being circled. NFX circuit 49 receives the modeset command 136 and carries out the command. The command is a command to NFX circuit 49 to change the mode of the C1 port to the command mode. Once this is done, NFX 51 can send a command to the C1 port of NFX 49 and NFX 49 will carry out that command. Likewise, NFX 49 can send a command out if its C1 port to the A1 port of NFX 51. The command mode link is bidirectional in this sense.

Figure 19:
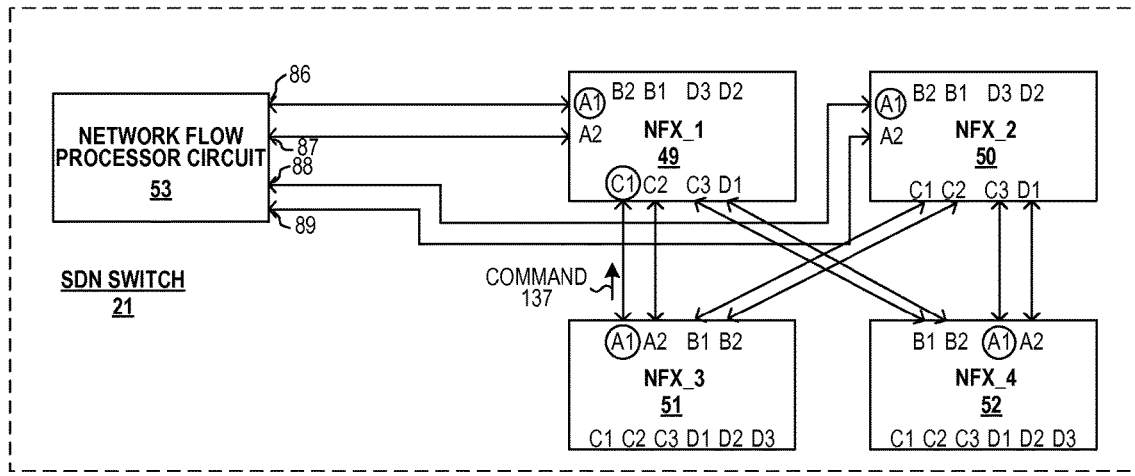
FIG. 19 is a diagram of a third step of the NFX configuration method.

FIG. 19 illustrates a third step of the configuration method. The NFX circuit 51 sends a command 137 out of its port A1 into the C1 port of NFX circuit 49. The C1 port of NFX circuit 49 is now operating in the command mode, so NFX 49 will carry out the command 137.

Figure 20:
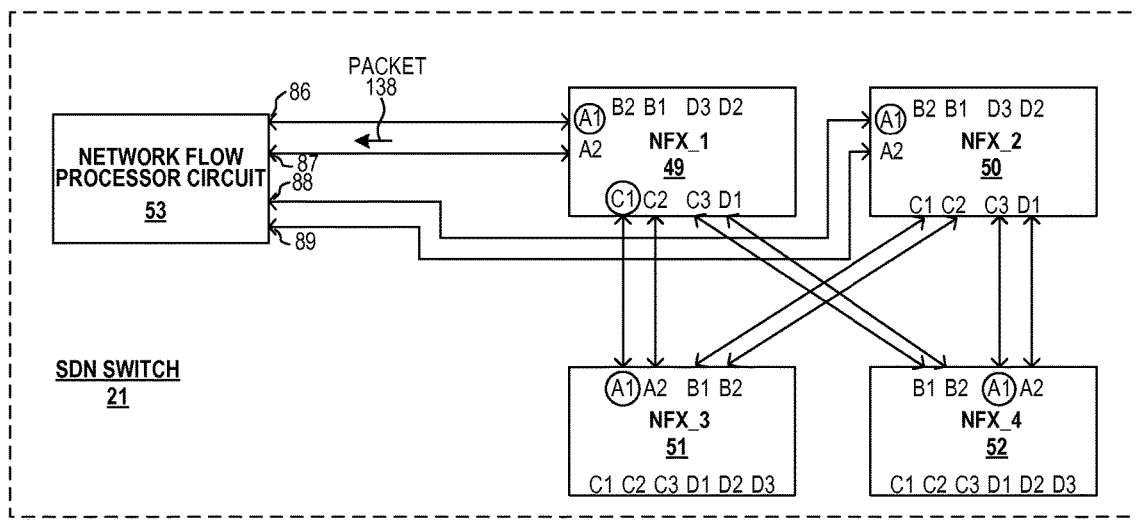
FIG. 20 is a diagram of a fourth step of the NFX configuration method.

FIG. 20 illustrates one specific example of the carrying out of command 137. In this particular example, command 137 is a command to NFX 49 to forward a packet 138 (the packet carried by command 137) out of port A2 of NFX circuit 49 so that the packet 138 will be sent to network port 87 of the NFP circuit 53. In this example, even though the ingress portion of a port that is operating in the data mode is prevented from acting on a special command packet, the egress portion of a port in the data mode can output a command packet. Accordingly, the packet 138 is communicated out of port A2 of NFX 49 and to port 87 the NFP circuit 53.

As indicated above, command packets can originate from the NFP circuit, and command packets can also originate from NFX circuits. A command packet can contain a command for a specified target NFX circuit to output a packet onto a particular egress port of the target NFX circuit, where the packet output is actually a command packet itself. Alternatively, a command packet can be generated and output from an NFX due to the classifier circuit of the NFX responding to a particular type of command whose indicated operation requires the outputting of the command by the NFX. All inter-NFX network communication between NFX circuits is command mode communication, so if a packet received onto the SDN switch via one NFX is to be switched so that it exits the SDN switch via another NFX, then the packet after being received by the receiving NFX is transferred using the command mode to the other NFX that will output the packet from the SDN switch. The action of the operative flow entry in the receiving NFX is an instruction to cause the receiving NFX to use the packet forwarding command to forward the packet to the output NFX.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method of Software-Defined Networking (SDN) switching, wherein a SDN switch comprises a fabric of Network Flow Switch (NFX) circuits and a Network Flow Processor (NFP) circuit, wherein none of the NFX circuits comprises any SDN protocol stack, wherein packets received onto the SDN switch from external sources are received via the fabric of NFX circuits, wherein packets output from the SDN switch to external destinations are output via the fabric of NFX circuits, wherein each of the NFX circuits maintains at least one flow table, wherein the NFP circuit maintains at least one flow table, the method comprising:
   (a) receiving a packet of a flow onto the SDN switch via a first NFX circuit;
   (b) determining in the first NFX circuit that the packet matches a flow entry stored in at least one flow table in the first NFX;
   (c) counting a number of packets of the flow received;
   (d) determining that the number of packets of the flow received is above a threshold value;
   (e) forwarding one of the packets of the flow from the first NFX circuit to the NFP circuit;
   (f) determining in the NFP circuit that the one of the packets matches a flow entry stored in the flow table in the first NFX circuit;
   (g) generating a second flow entry in the NFP circuit, wherein the second flow entry applies to a relatively narrow sub flow of packets;
   (h) forwarding the second flow entry from the NFP circuit to the first NFX circuit and storing the second flow entry in at least one flow table in the first NFX circuit; and
   (i) receiving a subsequent packet of the flow onto the SDN switch via the first NFX circuit and determining that the subsequent packet matches the second flow entry and using the second flow entry to output the subsequent packet from the SDN switch without forwarding the subsequent packet to the NFP circuit.

2. The method of claim 1, wherein the first flow entry is a SDN flow entry, wherein the SDN flow entry was received onto the SDN switch as part of a SDN protocol message.

3. The method of claim 2, wherein the second flow entry is not a SDN flow entry, and wherein the second flow entry was not received onto the SDN switch as a part of any SDN protocol message.

4. The method of claim 3, wherein the SDN switch further comprises a controller processor, the method further comprising:
   (j) executing an SDN protocol stack on the controller processor, wherein the SDN protocol message is processed by the SDN protocol stack, and wherein neither the NFP circuit nor any of the NFX circuits of the fabric of NFX circuits executes any SDN protocol stack.

5. The method of claim 1, wherein the NFP circuit receives multiple packets of the relatively narrow subflow of packets from the first NFX circuit after the receiving of (a) and before the NFP circuit generates the second flow entry in (g).

6. The method of claim 1, wherein the first NFX circuit analyzes the packet received in (a) thereby generating analysis information, and wherein the first NFX circuit forwards the analysis information to the NFP circuit in (e) along with the one of the packets of the flow.

7. The method of claim 6, wherein the NFX circuits are all substantially identical to one another, and wherein none of the NFX circuits comprises any instruction-executing processor that fetches instructions, that has an instruction counter, and that analyzes any packet.

8. The method of claim 1, wherein the SDN switch comprises a plurality of printed circuit boards and a housing, wherein the fabric of NFX circuits and the NFP circuit are disposed on the printed circuit boards and are disposed within the housing.

9. The method of claim 1, further comprising:
   (j) maintaining a flow table on the NFP circuit that contains a copy of all flow entries stored in the first NFX circuit.

10. The method of claim 9, wherein the first NFX circuit comprises no flow table that stores any SDN flow entry.

11. The method of claim 1, wherein after the second flow entry is stored in the first NFX circuit in (h) some packets of the flow are then received onto the SDN switch via the fabric of NFX circuits and are output from the SDN switch without ever being forwarded to the NFP circuit whereas other packets of the broad flow are received onto the SDN switch via the fabric of NFX circuits and are forwarded to the NFP circuit before being output from the SDN switch via the fabric of NFX circuits.

12. A method of Software-Defined Networking (SDN) switching, wherein the SDN switch comprises a fabric of Network Flow Switch (NFX) circuits and a Network Flow Processor (NFP) circuit, wherein none of the NFX circuits comprises any SDN protocol stack, wherein packets received onto the SDN switch from external sources are received via the fabric of NFX circuits, wherein packets output from the SDN switch to external destinations are output via the fabric of NFX circuits, wherein each of the NFX circuits maintains at least one flow table, wherein the NFP circuit maintains at least one flow table, the method comprising:

(a) receiving a packet of a flow onto the SDN switch via a first NFX circuit;

(b) determining in the first NFX circuit that the packet matches a first flow entry stored in a flow table in the first NFX circuit and that a number of packets received of the flow is greater than a threshold value, wherein the first flow entry applies to a relatively broad flow of packets;

(c) outputting the packet from the SDN switch in accordance with the first flow entry;

(d) generating a second flow entry in the NFP circuit, wherein the second flow entry applies to a relatively narrow subflow of packets, wherein the packet received in (a) is one of the packets of the relatively narrow subflow of packets, wherein all packets of the relatively narrow subflow of packets are also packets of the relatively broad flow of packets, and wherein some packets of the relatively broad flow of packets are not packets of the relatively subflow of packets;

(e) forwarding the second flow entry from the first NFP circuit to the NFX circuit and storing the second flow entry in at least one flow table in the first NFX circuit;

(f) receiving a first subsequent packet of the relatively broad flow of packets onto the SDN switch via the first NFX circuit and determining that the first subsequent packet matches the second flow entry and using the second flow entry to output the first subsequent packet from the SDN switch without consulting any flow table in the NFP circuit; and (g) receiving a second subsequent packet of the relatively broad flow of packets onto the SDN switch via the first NFX circuit and determining that the second subsequent packet does not match the second flow entry and forwarding the second subsequent packet to the NFP circuit before outputting the second subsequent packet from the SDN switch.

13. The method of claim 12, wherein the first NFX circuit that received the packet in (a) analyzes the packet received in (a) thereby generating analysis information, and wherein the first NFX circuit forwards the analysis information to the NFP circuit before the generating of the second flow entry in (d).

14. The method of claim 13, wherein the NFX circuits are all substantially identical to one another, and wherein none of the NFX circuits comprises any instruction-executing processor that fetches instructions, that has an instruction counter, and that analyzes any packet.

15. The method of claim 12, further comprising:

(h) maintaining on the NFP circuit a copy of all flow entries that are stored in any flow table of any of the NFX circuits.

16. The method of claim 12, wherein the first flow entry is an SDN flow entry, and wherein the second flow entry is not an SDN flow entry.

17. The method of claim 12, wherein the SDN switch comprises a plurality of printed circuit boards and a housing, wherein the fabric of NFX circuits and the NFP circuit are disposed on the printed circuit boards and are disposed within the housing.

18. The method of claim 17, wherein the second flow entry is forwarded in (e) at least in part by sending the second flow entry out of the NFP circuit as part of a MAC frame, wherein the MAC frame is received by an NFX circuit of the fabric of NFX circuits.

19. The method of claim 18, wherein the NFX circuits of the fabric communicate with one another by sending each other MAC frames across network links, wherein the network links do not extend between NFX circuits and do not extend outside of the housing.

20. The method of claim 18, wherein the NFX circuits of the fabric communicate with one another across network links, wherein the network links do not extend between NFX circuits and do not extend outside of the housing.

* * * * *